Feb. 29, 1944. T. W. BUTTNER ET AL 2,342,723
METHOD FOR DEHYDRATING AND DEACIDIFYING HYDROCARBON
OILS AND TRANSFORMER COOLANTS
Filed June 30, 1941 3 Sheets-Sheet 3
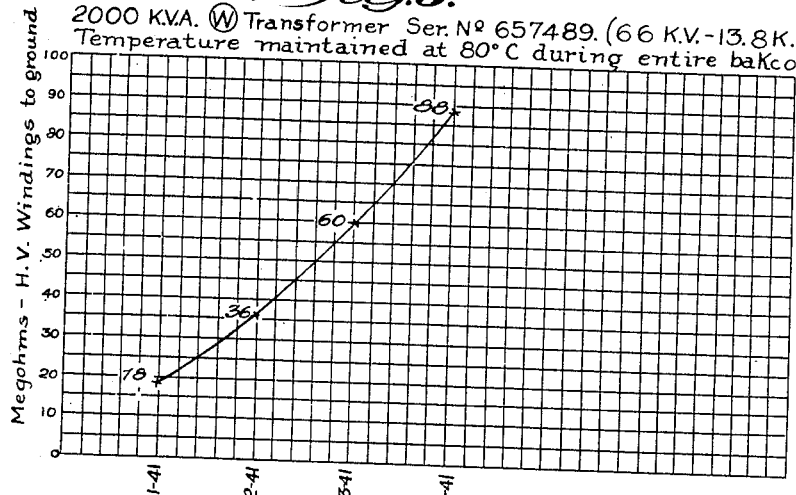
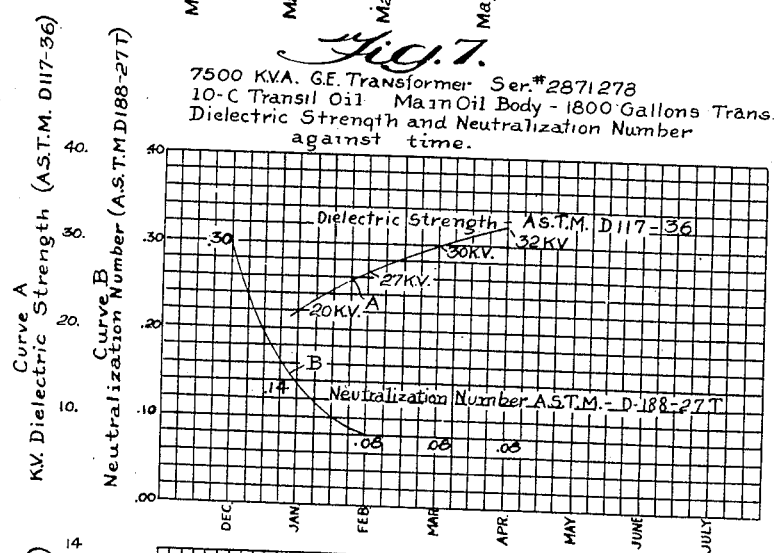
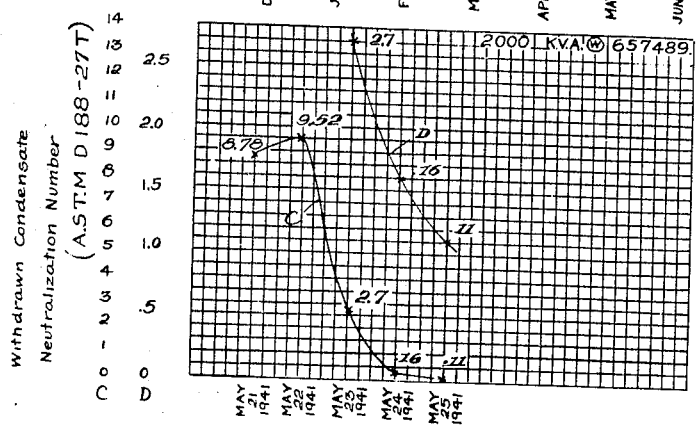
Inventors
Theodore W. Buttner
John G. Martin
Attorney Patented Feb. 29, 1944

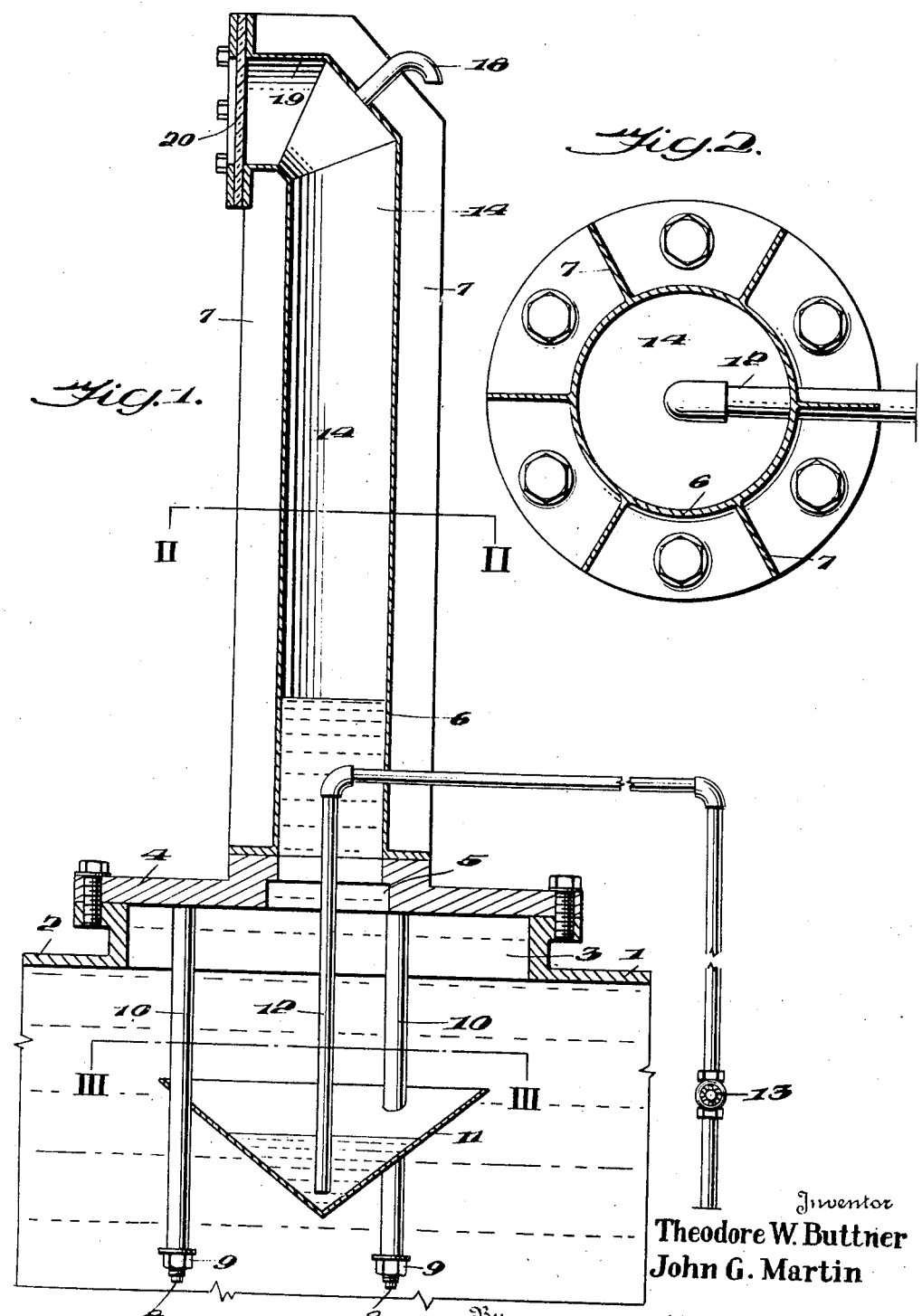

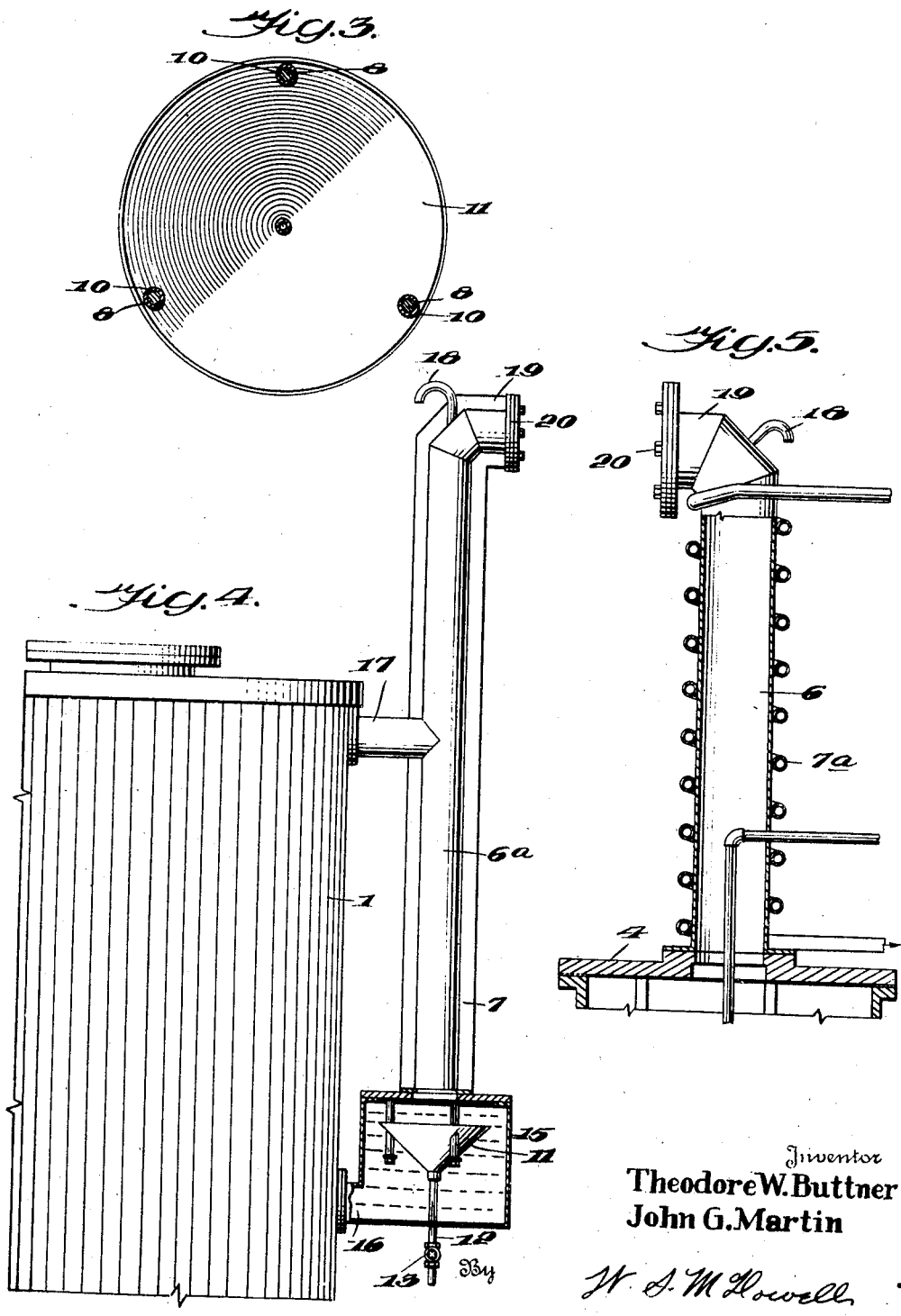

2,342,723

UNITED STATES PATENT OFFICE 2,342,723

METHOD FOR DEHYDRATING AND DEACIDIFYING HYDROCARBON OILS AND TRANSFORMER COOLANTS

Theodore W. Buttner and John G. Martin, Columbus, Ohio

Application June 30, 1941, Serial No. 400,540

3 Claims. (Cl. 196—3)

This invention relates to an improved method for dehydrating and deacidifying hydrocarbon oils. In its more specific aspects, the present invention is concerned with electrical transformers of the oil-immersed type.

It is known that petroleum oils which have been exposed to the atmosphere contain absorbed water vapor and oxygen. The oxygen combines chemically with the oil, producing water and acids which attack most metals and organic materials and, in addition, lower the value of the oil as a transformer dielectric. This moisture and acid content, when present in the oil of a transformer, shortens the life of the transformer insulation, causes sludging of the oil, increases operating temperatures and produces various electrical losses.

As a result of these conditions, it is necessary in the maintenance of oil-immersed transformers to comparatively frequently remove the used oil and replace with fresh oil or a processed used oil from which water, acid and sludge have been but incompletely removed, all of which adds considerably to the maintenance costs of transformers of the type under consideration.

It is an object of the present invention to provide in connection with an oil-filled transformer a simple and efficient method for trapping and collecting water, acids and other impurities as the latter are formed, effectively preventing such impurities from contaminating the oil and reducing its value and efficiency, as well as that of the electrical apparatus in such a transformer.

For a further understanding of the invention, reference is to be had to the following description and the accompanying drawings, wherein:

Fig. 1 is a vertical sectional view disclosing an oil-filled transformer provided with the combined vent pipe and rectifier, wherein the method comprising the present invention is carried out;

Fig. 2 is a horizontal sectional view on the line II—II of Fig. 1;

Fig. 3 is a similar view on the line III—III of Fig. 1;

Fig. 4 is a view partly in vertical section and partly in front elevation showing a slightly modified form of the present invention, wherein the rectifier is arranged at the side of a transformer casing;

Fig. 5 is a similar view showing a further modified form of the invention;

Figs. 6, 7 and 8 are graphs showing performance values obtained by the use of the present invention on transformer oils.

Referring more particularly to the drawings, the numeral 1 designates the casing of an oil-filled transformer of standard construction. The top wall 2 of the casing is provided with the usual manhole opening 3. Bolted to the upper surface of the wall 2 in concentric relation to the opening 3 is an annular plate 4 having an opening 5 in the center thereof, and bolted to the upper surface of the plate 4 and arising from the latter is a vent pipe 6. This pipe forms an explosion relief member in that it establishes communication between the interior of the casing 1 and the atmosphere and also said pipe forms a part of the rectifier constituting the present invention. If desired, the walls of the pipe 6 may be formed with ribs or fins 7 to increase the surface area thereof and to enable the same to be more effectively cooled. Also, if desired, the pipe 6, as shown in Fig. 5, may be surrounded by a coil 7a for the passage of a fluid cooling medium.

Depending from the plate 4 are spaced stationary studs 8, the lower ends of the latter being threaded for the reception of nuts 9. Positioned on the studs 8 are metallic tubes 10, the latter having fixed thereto a condensate receiver 11, said receiver being disposed in axial alignment with the pipe 6 and the opening 5, in order that condensate which accumulates on the inner surfaces of the pipe 6 may drop by gravity through the opening 5 and be trapped by the receiver for removal from the main body of oil contained within the transformer. The bottom of the receiver 11 communicates with a drain pipe 12, which preferably leads to a point exteriorly of the casing 1. This pipe may have its outlet provided with a control valve 13 so that the receiver may be drained from time to time without interfering with the operation of the transformer.

An air, gas or vapor space 14 is produced in the column 6 above the oil level, the released volatiles being in part, at least, condensed by engagement with the relatively cool inner surfaces of the column 6. Inasmuch as the undesired compounds are heavier than the oil, i. e., possess a higher specific gravity, the same gravitate in a general downward direction through the oil and are trapped in the catch basin or receiver 11. These undesired compounds comprise water, acids, gums and other oxidation products and are known by the generic term "sludge."

When the invention is used in connection with an oil-filled transformer, the operation of the electrical elements of the transformer cause the oil to become heated. The amount of heat is sufficient to set up a thermal circulation of the oil, the warmer products thereof arising to the top of the transformer casing and into the column 6, while the cooler oil flows toward the bottom of the casing.

It will be seen that by the use of the present invention, a method is provided for continuously purifying the oil and removing objectionable foreign compounds therefrom. This is accomplished during the operation of the transformer and it has been found through the use of the apparatus here disclosed that the oil maintains its purity and freedom from such objectionable compounds. In fact, the use of the invention has been found to actually increase the electrical characteristics of the oil, raising it to values above those of new commercially obtainable transformer oils. This enables a transformer to be kept in continuous operation with full efficiency and avoids the necessity of periodically removing transformers from service for renovating the oil and/or cleaning the transformer inner casing, core and windings, to remove water and sludge deposits, as is now the general practice. Further, the invention eliminates the sludging of oils and their costly replacement with new oils, at least so far as we can now determine.

The graph depicted in Fig. 6 is employed to illustrate the improvement of the electrical characteristics of the oil treated by the present invention. In obtaining the results disclosed in Fig. 6, a 2000 k. v. a. Westinghouse transformer, Serial No. 657,489 (66 k. v.–13.8 k. v.) was used, with the temperature of the transformer oil maintained at 80 degrees C. throughout the entire operation. The ordinates of the graph indicate the number of days of the operation and the abscissae readings in megohms. A low megger reading means high losses by conduction through the oil and a high reading means a reduction in these losses. At the beginning of the operation, the megohm value was 18, and after three days run, with the oil at the temperature specified, the megohm value was raised to 88. The curve plotted in this graph indicates the improved megger reading and the general improvement in the condition of the oil, after three days operation with the use of the rectifier forming the invention.

In the operation illustrated in Fig. 7, a 7500 k. v. a. General Electric transformer was used, Serial No. 2,871,278, containing 1800 gallons of No. 10–C Transil oil. In Fig. 7, the graph depicts dielectric strength and neutralization number of the oil against time. The ordinates represent time measured in months, while the abscissae depict k. v. dielectric strength (A. S. T. M. D117–36) and, also, neutralization number (A. S. T. M. D188–27T). The curve A denotes dielectric strength while the curve B indicates the neutralization number. It will be understood that a high neutralization number indicates high acidity which, in turn, means high conductivity on the part of the oil, helping to produce a high operating temperature.

It will be understood that the curve A shows the improvement of the dielectric strength of the oil in three months of operation, increasing from 20 k. v. to 32 k. v., whereas the neutralization number dropped from .30 to .08 in two months of operation. This G. E. transformer, during the time covered by Fig. 7, was in continuous normal operation, and the graphs are typical of those obtained from many other transformers equipped with the apparatus forming the present invention.

In Fig. 8, the graph illustrates the improvement in the neutralization number of the withdrawn condensate taken from the trap during four days of bake-out operation with the use of our improved rectifier in conjunction with the transformer of Fig. 6. The abscissa of the graph represents time measured in days, while the ordinates set forth the neutralization number (A. S. T. M. D188–27T). The curve C plotted on this graph discloses that the liquid condensate at the beginning of the operation on May 21, 1941, possessed a neutralization number of 8.78, increasing after 24 hours operation to 9.52. After this the neutralization number dropped sharply so that on May 24, 1941, the neutralization number was .16 and on May 25, 1941, .11. The curve D indicated in Fig. 8, and which is plotted against the second ordinate scale, is merely an enlargement of the lower portion of the curve C.

In the form of the invention disclosed in Fig. 4, the column 6a is arranged at the side of the transformer casing. The bottom of the column is provided with a box-like housing 15, in which is contained the sludge trap 11. The housing communicates with the interior of the casing by means of a branch pipe 16. Likewise, a similar branch pipe 17 establishes communication between the upper part of the casing 1 and the column 6a. A breather pipe 18 is carried in connection with the vapor space provided at the tops of the columns 6 and 6a. The column 6 terminates at its upper end in a laterally directed portion 19, the front of which is closed by means of a frangible plate 20. In the event of an explosion, the plate 20 is fractured and a relief provided for the pressures developed.

The upper portion of the rectifier column, that is, the internal space of the column above the oil level, acts as a true rectifier, condensing the lower boiling point water, acids and the like, while the higher boiling point oil vapors are not condensed, this function taking place above the oil level and apparently not below. The products of condensation have higher density but lower boiling points, hence higher vapor pressures than does the oil. The condensed water vapor and acids therefore gravitate into the receiver or trap, from which they may be led off in any suitable way.

In view of the foregoing, it will be seen that the present invention provides a simple and economical method which may be readily employed in connection with an electrical transformer of the oil-immersed type. While the features of the present invention are particularly applicable to such transformers, nevertheless, it will be understood that in its broader aspects, the invention is adaptable to other practical applications wherein hydrocarbon oils are employed such as in the treatment of turbine lubricating oils. In the transformer, the heat supplied for establishing thermal circulation of the oil is obtained from the transformer elements, whereas in certain other uses of the invention, it may be necessary to directly heat the oil to obtain such circulation. Also, the system is applicable to installations in which the oil is blanketed by an inert gas.

Transformer oils are commercially available under many trade-names, such as Transil oil, Pyranol, and therefore when the term hydrocarbon oil is used in this specification and the claims, we intend to include within the purview thereof any of the commercially available transformer coolants.

What is claimed is:

1. The method of continuously dehydrating and deacidifying the cooling oil of an oil-immersed transformer which comprises: heating the oil within the casing of such a transformer to produce thermal circulation on the part thereof, bringing the oil while it is undergoing such circulation into contact with relatively cool surfaces whereby to cause undesired water and oxidation products present in the oil to condense or coalesce on such surfaces in the form of bodies having a higher specific gravity than that of the oil, and gravitationally releasing said bodies from said cool surfaces and trapping the same upon their gravitational descent to effect their segregation and removal from the main body of oil.

2. The method of dehydrating and deacidifying the cooling oil of an oil-immersed transformer which comprises: bringing a heated circulating body of such oil into contact with rectifier surfaces, whereby to condense or coalesce on such surfaces objectionable compounds having a higher specific gravity but a lower boiling point than that of the oil, and trapping such compounds by interposing a receiver therefor in their path of gravitational descent, whereby to separate and remove from the oil said undesired compounds.

3. The method of removing acid sludge formed in situ in dielectric transformer oils, the steps which comprise introducing a thermally circulating body of such oil retained in a transformer casing into a rectifying zone, the latter having open unrestricted communication with the interior of the casing, whereby to cause the circulating oil to contact cooled surfaces of the rectifying zone to effect condensation of compounds having a higher specific gravity than that of the oil itself, and trapping such compounds upon their gravitational descent through the main oil body in order to effect their segregated removal from the system.

THEODORE W. BUTTNER.
JOHN G. MARTIN.